(12) United States Patent
Wang et al.

(10) Patent No.: US 7,934,024 B2
(45) Date of Patent: Apr. 26, 2011

(54) METHOD FOR READING AND WRITING NON-STANDARD REGISTER OF SERIAL ADVANCED TECHNOLOGY ATTACHMENT (SATA) DEVICE

(75) Inventors: Jar-Haur Wang, Hsin-Tien (TW); Yen-Bo Lai, Hsin-Tien (TW)

(73) Assignee: Via Technologies Inc., Hsin-Tien, Taipei County (TW)

( * ) Notice: Subject to any disclaimer, the term of this patent is extended or adjusted under 35 U.S.C. 154(b) by 1032 days.

(21) Appl. No.: 11/287,274

(22) Filed: Nov. 28, 2005

(65) Prior Publication Data

US 2006/0293764 A1    Dec. 28, 2006

(30) Foreign Application Priority Data

Jun. 24, 2005    (TW) ............................... 94121228 A

(51) Int. Cl.
G06F 3/00    (2006.01)
(52) U.S. Cl. ................................ 710/5; 710/74; 700/11
(58) Field of Classification Search .................... 700/10, 700/11; 710/8, 12, 20, 22, 74, 5; 711/103, 711/11, 111; 713/300
See application file for complete search history.

(56) References Cited

U.S. PATENT DOCUMENTS

| | | | |
|---|---|---|---|
| 6,922,738 B2 * | 7/2005 | Drescher et al. | 710/20 |
| 7,165,125 B2 * | 1/2007 | Lissel et al. | 710/22 |
| 7,296,094 B2 * | 11/2007 | Bashford et al. | 710/12 |
| 7,404,013 B1 * | 7/2008 | Masiewicz | 710/5 |
| 2004/0158669 A1 * | 8/2004 | Weng et al. | 711/103 |
| 2005/0005062 A1 * | 1/2005 | Liu et al. | 711/112 |
| 2005/0144490 A1 * | 6/2005 | Igari | 713/300 |
| 2006/0112216 A1 * | 5/2006 | Bashford et al. | 711/105 |

* cited by examiner

*Primary Examiner* — Charles R Kasenge
(74) *Attorney, Agent, or Firm* — Thomas, Kayden, Horstemeyer & Risley, LLP

(57) ABSTRACT

A method for reading non-standard register of Serial Advanced Technology Attachment (SATA) devices discloses an unused input parameter of standard command setting up as an executive parameter. While receiving the standard command, a SATA host controller converts the executive parameter and the standard command into input frame information structure (FIS) that is sent to the SATA devices for the SATA devices to detect the executive parameter for reading corresponding value of non-standard register and saving the value into an output register of the SATA devices. The value of the non-standard register is converted into output frame information structure for being sent to the SATA host controller and the value of the non-standard register is saved to the output register of the SATA host controller. Then by reading the value of the output register of the SATA host controller, the value of the non-standard register is learned.

21 Claims, 10 Drawing Sheets

| Register | 7 | 6 | 5 | 4 | 3 | 2 | 1 | 0 |
|---|---|---|---|---|---|---|---|---|
| Features | na ||||||||
| Sector Count | Sector count ||||||||
| LBA Low | LBA (7:0) ||||||||
| LBA Mid | LBA (15:8) ||||||||
| LBA High | LBA (23:16) ||||||||
| Device | obs | na | obs | DEV | LBA (27:24) ||||
| Command | C8h ||||||||

Fig.1A

| Register | 7 | 6 | 5 | 4 | 3 | 2 | 1 | 0 |
|---|---|---|---|---|---|---|---|---|
| Error | na ||||||||
| Sector Count | na ||||||||
| LBA Low | na ||||||||
| LBA Mid | na ||||||||
| LBA High | na ||||||||
| Device | obs | na | obs | DEV | na | na | na | na |
| Status | BSY | DRDY | DF | na | DRQ | na | na | ERR |

Fig.1B

|   | 31 30 29 28 27 26 25 24 | 23 22 21 20 19 18 17 16 | 15 14 13 12 11 10 9 8 | 7 6 5 4 3 2 1 0 |
|---|---|---|---|---|
| 0 | Features | Command | C R R Reserved (0) | FIS Type (27h) |
| 1 | Device | LBA High | LBA Mid | LBA Low |
| 2 | Features (exp) | LBA High (exp) | LBA Mid (exp) | LBA Low (exp) |
| 3 | Control | Reserved (0) | Sector Count (exp) | Sector Count |
| 4 | Reserved (0) | Reserved (0) | Reserved (0) | Reserved (0) |

Fig.2A

|   | 31 30 29 28 27 26 25 24 | 23 22 21 20 19 18 17 16 | 15 14 13 12 11 10 9 8 | 7 6 5 4 3 2 1 0 |
|---|---|---|---|---|
| 0 | Error | Status | R I R Reserved (0) | FIS Type (34h) |
| 1 | Device | LBA High | LBA Mid | LBA Low |
| 2 | Reserved (0) | LBA High (exp) | LBA Mid (exp) | LBA Low (exp) |
| 3 | Reserved (0) | Reserved (0) | Sector Count (exp) | Sector Count |
| 4 | Reserved (0) | Reserved (0) | Reserved (0) | Reserved (0) |

Fig.2B

METHOD FOR READING AND WRITING NON-STANDARD REGISTER OF SERIAL ADVANCED TECHNOLOGY ATTACHMENT (SATA) DEVICE

BACKGROUND OF THE INVENTION

1. Field of the Invention

The present invention relates to a non-standard register of Serial Advanced Technology Attachment (SATA) devices, especially to use a standard command with an unused input parameter to drive the SATA device to read value of the non-standard register or write data into the non-standard register.

2. Description of the Related Art

Due to progress of information technology and prosperous development of the computer system, users have higher requirements for transmission and heat dissipation efficiency of computer peripherals. Thus the SATA (Serial Advanced Technology Attachment) specification is developed in order to meet users' requirements of computer peripherals.

The SATA standard interface dramatically improves the transmission and heat dissipation efficiency of computer peripherals. However, in order to assure stability and extension of computer peripherals, during development process of computer peripherals, error detection and efficiency analysis of computer peripherals are getting more important. Thus research and development staff arranges non-standard registers inside the computer peripherals so as to detect the status of peripherals or turn on/off the peripherals. By reading or changing values of these non-standard registers, analyzing process is executed.

These non-standard registers are hidden inside computer peripherals and main computer unit provides a standard interface that is only applied to registers defined by that standard interface. Thus for saving these non-standard registers of computer peripherals, a Universal Asynchronous Receiver/Transmitter (UART) or Inter Integrated Circuit (I2C) is used. A system chip of computer peripherals only needs two pins to read and write non-standard registers. Thus receiving pins are used to receive values of non-standard registers being intended to be read and write and then transmitting pins are used to transmit contents of non-standard registers. However, such kind of method can only be applied to computer systems with Universal Asynchronous Receiver/Transmitter (UART) or Inter Integrated Circuit (I2C) for retrieving values of non-standard registers. Therefore, it's less flexible on applications.

Furthermore, some manufactures use Vender specific commands to write into non-standard registers inside the standard interface device. Yet in standard specification of SATA, only part of Vender specific commands are set for use. Once most of the Vender specific commands is set to have specific function, there is not enough Vender specific commands when research and development staff want to use the Vender specific command to define the standard interface device for executing reading and writing commands of non-standard register.

SUMMARY OF THE INVENTION

Therefore it is a primary object of the present invention to provide a method for reading and writing non-standard register inside SATA devices that sets up commands for reading and writing the non-standard register inside SATA devices by a standard command including an unused input parameter. Therefore, the purpose for reading and writing the non-standard register is achieved.

It is another object of the present invention to provide a method for reading and writing non-standard register inside SATA devices that makes the SATA devices detect confirmation parameters for confirming values of the non-standard registers intend to read and write by setting up unused input parameters of standard commands as the confirmation parameters while the SATA devices receive corresponding standard commands and input frame information structure (FIS) of the confirmation parameters. Thus the SATA devices won't read or change values of the non-standard register under unexpected situation.

By setting up an unused input parameter of a standard command as an executive parameter, sending the standard command with the executive parameter into the SATA host controller for converting the standard command and the executive parameter into input frame information structure as well as transmitting the input frame information structure into SATA devices, a method for reading and writing non-standard registers inside SATA devices according to the present invention makes the SATA devices detect the executive parameters for reading values of the corresponding non-standard register and saving values of the non-standard register into output register of the SATA devices thereof. The output register corresponds to the unused input parameter in response to the standard command. Then the SATA devices convert the values of the non-standard register into output frame information structure that is sent to the SATA host controller so that the SATA host controller saves the value of the non-standard register into a corresponding output register of the SATA host controller. At last, the value of the non-standard register is learned by reading the value of the output register of the SATA host controller.

Moreover, the present invention can also make the SATA devices execute issues corresponding to an executive parameter-that is writing a data parameter into the non-standard register that corresponds to the executive parameter by setting up the unused input parameters of a standard command as the executive parameter and the data parameter respectively, sending the standard command with the executive parameter and the data parameter into the SATA host controller, and converting the executive parameter, data parameter and standard command into output frame information structure that is sent to the SATA devices by the SATA host controller.

Furthermore, before setting up an unused input parameter of a standard command as an executive parameter, the present invention sets up an unused input parameter of another standard command as a confirmation parameter, sends the standard command with the confirmation parameter into the SATA host controller for being converted into input frame information structure that is sent to the SATA device so that the SATA device detects the confirmation parameter for confirming the function of the non-standard register intended to read and write. Or the present invention directly sets up another unused parameter as a confirmation parameter when sets up the unused input parameter of the standard command as the executive parameter so that the SATA device detects the confirmation parameter for confirming the function of the non-standard register intended to read and write.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1A is a format list of 28 bit READ DMA standard command in accordance with the present invention;

FIG. 1B is a format list of the present invention in response to 28 bit READ DMA standard command;

FIG. 2A is a format list of input frame information structure of the READ DMA standard command in accordance with the present invention;

FIG. 2B is a format list of the present invention in response to 2 input frame information structure of the READ DMA standard command;

DETAILED DESCRIPTION OF THE PREFERRED EMBODIMENT

Figure 3:
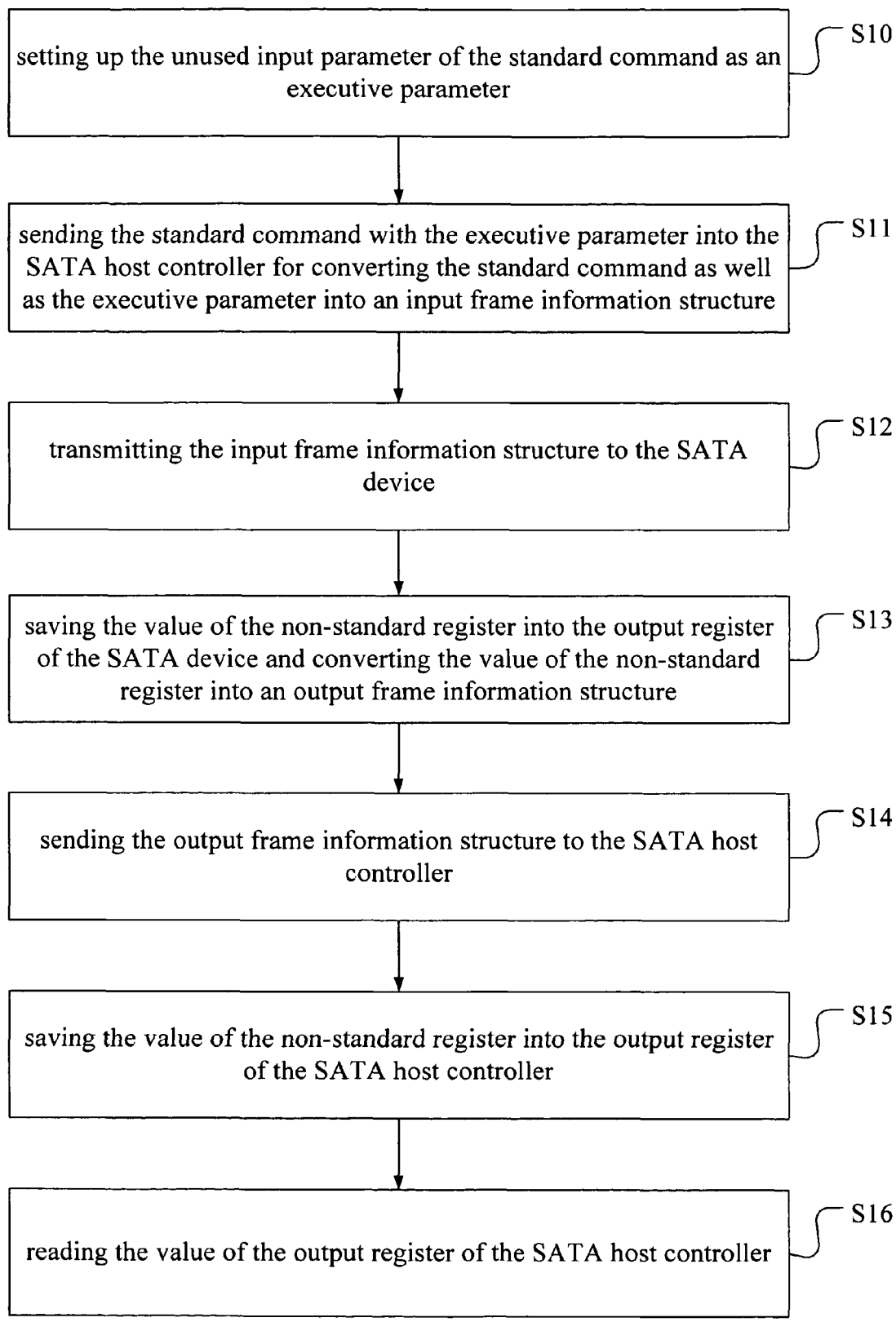
FIG. 3 is a flow chart of the present invention to read values of a non-standard register.

In a prior art, the SATA devices read and write non-standard register by using UART interface, I2C interface, or vender specific commands. The difference between the present invention and prior art is that the SATA devices read or change values of non-standard register while being driven by at least one unused input parameter of standard commands and an output register that responses to the standard commands. The output register corresponds to at least one unused output parameter of the standard command.

In specification of standard interface such as ATA and ATAPI, standard commands are defined. Because the SATA (Serial Advanced Technology Attachment) specification is derived from ATA standard interface specification, users can make SATA devices to execute corresponding standard issues by sending a standard command defined by ATA standard interface specification to the SATA devices. Taking a 28 bit standard command as an example, refer to FIG. 1, a format list of 28 bit READ DMA standard command in accordance with the present invention is disclosed. There is a plurality of input parameters including a Features register parameter, a Sector Count register parameter, a LBA Low register parameter, a LBA Mid register parameter, a LBA High register parameter, a Device register parameter, and a Command register parameter.

The method for sending the READ DMA standard command into the SATA devices is described as following:

In the beginning, input parameters of the READ DMA standard command are set up in sequence. That is—the Features register parameter, the Sector Count register parameter, the LBA Low register parameter, the LBA Mid register parameter, the LBA High register parameter and the Device register parameter are set up sequentially. The values of the above parameters are written and saved into a corresponding input register inside a SATA host controller. Then send and save the Command register parameters into a corresponding command register of the SATA host controller.

When the SATA host controller detects that a command register saves the Command register parameter, it converts the standard command and values of the related input register corresponding to the standard command into input Frame Information Structure, as shown in FIG. 2A. That is saving the READ DMA standard command into the Command field in FIG. 2A and the values of the input register inside the SATA host controller—including values of the Features register, Sector Count register, LBA Low register, LBA Mid register, LBA High register, and Device register are saved into a corresponding Features field, a Sector Count field, a LBA Low field, a LBA Mid field, a LBA High field and a Device field of FIG. 2A.

Moreover, according to the definition of SATA standard interface specification, the SATA host controller writes input parameters corresponding to input frame information structure into a FIS Type(27h) field, a C field, two R field, a Control field and a plurality of Reserved(0) field. The rest one Features (exp) field, a Sector Count (exp) field, a LBA Low (exp) field, a LBA Mid (exp) field, and a LBA High (exp) field are for filled with extension input parameters of 48 bit standard command. The 48 bit standard command is applied to extend the control of SATA devices-that means extending register address for controlling SATA devices. Thus the extension input parameters are saved into the extended address of input register. Because the above-mentioned extension input parameters is for 48 bit standard command, the above-mentioned extension input parameters are filled with random numbers, which are unused input parameters, while sending the 28 bit standard command.

Then, the SATA host controller sends the input frame information structure into the SATA device so that the SATA device saves all parameters of the input frame information structure into corresponding register and then detects command register for executing standard issues corresponding to the READ DMA standard command.

When the SATA device finishes execution of the READ DMA standard command, the SATA device fills the finished status into corresponding output register and also converts value of the output register into output frame information structure shown in FIG. 2B. That is all values of the output register are saved into corresponding field in FIG. 2B, wherein the Sector Count (exp) field, the LBA Low (exp) field, the LBA Mid (exp) field, and the LBA High (exp) field are for saving the extension output parameters in response to the 48 bit standard command. The extension output parameter is the value filled into the extended address of output register after the SATA devices finishing execution of the 48 bit standard command. Thus in response to the 28 bit standard command, extension output parameters are filled randomly into extended address of corresponding output register, that is output unused parameter. Moreover, according to definition of the SATA standard interface specification, the SATA device write parameters corresponding to the output frame information structure into a FIS Type(34h) field, a I field, two R field, and a plurality of Reserved(0) field.

Then the SATA device sends the output frame information structure into the SATA host controller that saves the values of the output frame information structure into corresponding output register, as shown in FIG. 1B, output parameters in response to the 28 bit READ DMA standard command.

Refer to FIG. 3, a flow chart of the present invention to read values of non-standard register is disclosed. At least one unused input parameter of a 28 bit READ DMA standard command and an output register corresponding to at least one unused output parameter in response to the READ DMA standard command are taken as examples. First, as shown in step S10, the unused input parameter of the standard command is set up as an executive parameter. In this embodiment, the extension parameter of the LBA Low register is the executive parameter whose value is ECh and the value of saved into extended address of corresponding LBA Low register inside the SATA host controller. After all input parameters corresponding to the READ DMA standard command are set up and saved into corresponding input register of the SATA host controller, then refer to step S11, the standard command with the executive parameter is sent into the SATA host controller—that means sending the standard command code of READ DMA-C8h into the SATA host controller and the C8h is saved into command register of the SATA host controller.

When the SATA host controller detects that the command register saves something, the SATA host controller converts the standard command and all parameters including the executive parameter into input frame information structure and run the step S12, sends the input frame information structure into the SATA device for saving the standard command and the executive parameter of the input frame information structure into corresponding register inside the SATA device. The command register is the extended address of the LBA Low register. Then the SATA device detects the command register, not only to execute standard issues corresponding to the READ DMA standard command, but further to read the value of a non-standard register corresponding to the executive parameter while detecting the value saved in the extended address of the LBA Low register is ECh. The value of the non-standard register is supposed to be D4h.

Refer to step S13, the value of the non-standard register is saved into the output register corresponding to unused output parameter in response to the READ DMA standard command. That is using the value of the non-standard register—D4h as unused output parameter and saving the D4h into a corresponding output register. In this embodiment, D4h working as extension parameter of the LBA Mid register is saved into extended address of the LBA Mid register and the value of the non-standard register is converted into output frame information structure. Then the SATA device take the step S14, sends the output frame information structure into the SATA host controller for executing step S15, saves the value of the non-standard register into a corresponding output register inside the SATA host controller—that is the extended address of the LBA Mid register inside the SATA host controller. At last, take the step S16, read the value of the output register of the SATA host controller—that is reading the extended address of the LBA Mid register so as to learn the value of the non-standard register.

Figure 4:
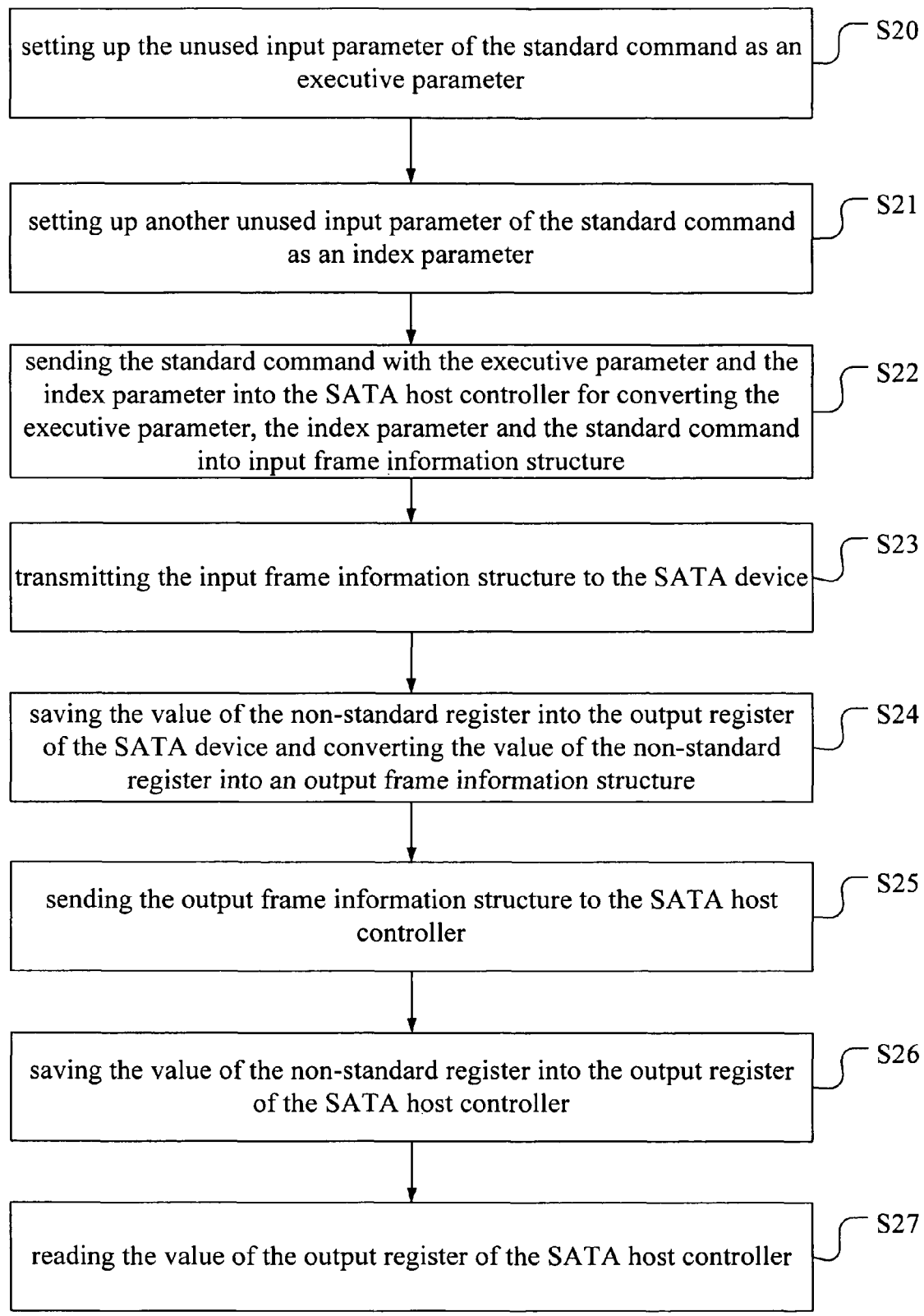
FIG. 4 is another flow chart of the present invention to read values of a non-standard register.

Refer to FIG. 4, a flowchart of another way for reading value of a non-standard register in accordance with the present invention is disclosed. When the SATA device is driven to read the value of the non-standard register, firstly as shown in step S20 and step S21, an unused input parameter of READ DMA standard command is set up as an executive parameter. In this embodiment, the extension parameter of the LBA Low register is set up as 21h. And another unused input parameter of the READ DMA standard command is set up as an index parameter. In this embodiment, the extension parameter of the LBA Mid register is set up as E0h. The executive parameter and the index parameter are respectively saved into corresponding input register inside the SATA device-extended address of the LBA Low register and the LBA Mid register. Then take the step S22, send the standard command with the executive parameter and the index parameter into the SATA host controller for converting the executive parameter, the index parameter and the standard command into input frame information structure; next, the SATA host controller runs the step S23, transmitting the input frame information structure into the SATA device for saving the executive parameter, the index parameter and the standard command into corresponding register inside the SATA device-that is extended address of the command register, LBA Low register, and the LBA Mid register. When the SATA device detects that the executive parameter saved in the extended address of the LBA Low register is 21h, the SATA device reads the value of the non-standard register corresponding to the index parameter E0h. Then, run from step S24 to step S27 for reading the value of the non-standard register. The step S24 to step S27 is the same with the step S13 to step S16 in FIG. 3.

Figure 5:
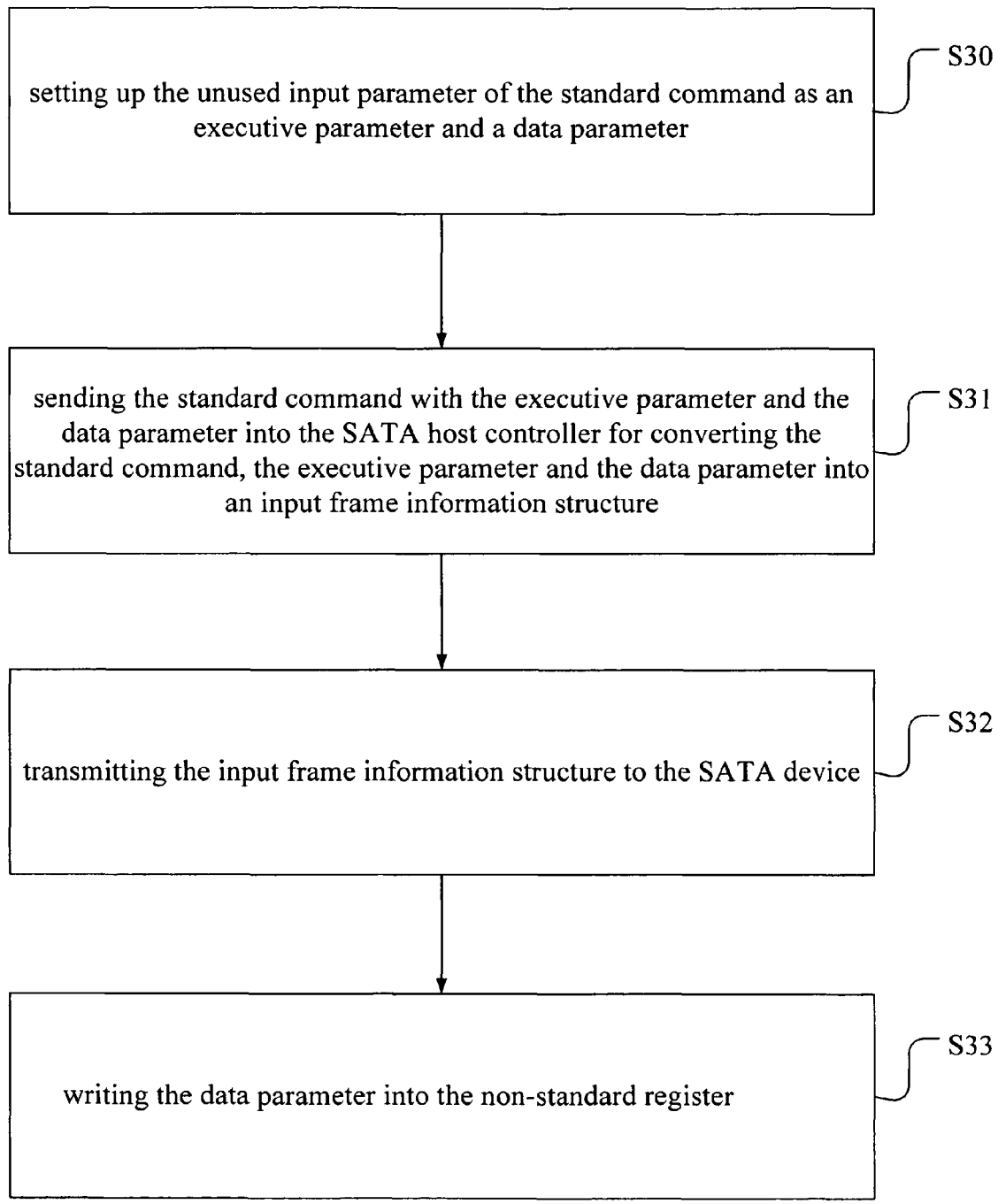
FIG. 5 is a flow chart of the present invention to write data into a non-standard register.

Refer to FIG. 5, besides using the 28 bit READ DMA standard command to read the value of the non-standard register, the present invention can also write information into the non-standard register. In the beginning, as shown in step S30, set up a plurality of unused input parameters of the READ DMA standard command as an executive parameter and a data parameter. In this embodiment, the LBA Low register extension parameter 3Ch is set up as the executive parameter while the LBA High register extension parameter 5Eh is set up as the data parameter and the executive parameter as well as the data parameter is saved into extended address corresponding to the LBA Low register as well as the LBA High register inside the SATA host controller. Then take the step S31, send the standard command with the executive parameter and the data parameter into the SATA host controller for converting the executive parameter, the data parameter and the standard command into input frame information structure. Next, according to the step S32, the SATA host controller transmits the input frame information structure into the SATA device for the SATA device to detect the executive parameter for reading the data parameter. At last, as shown in step S33, write the data parameter into the non-standard register corresponding to the executive parameter.

Figure 6:
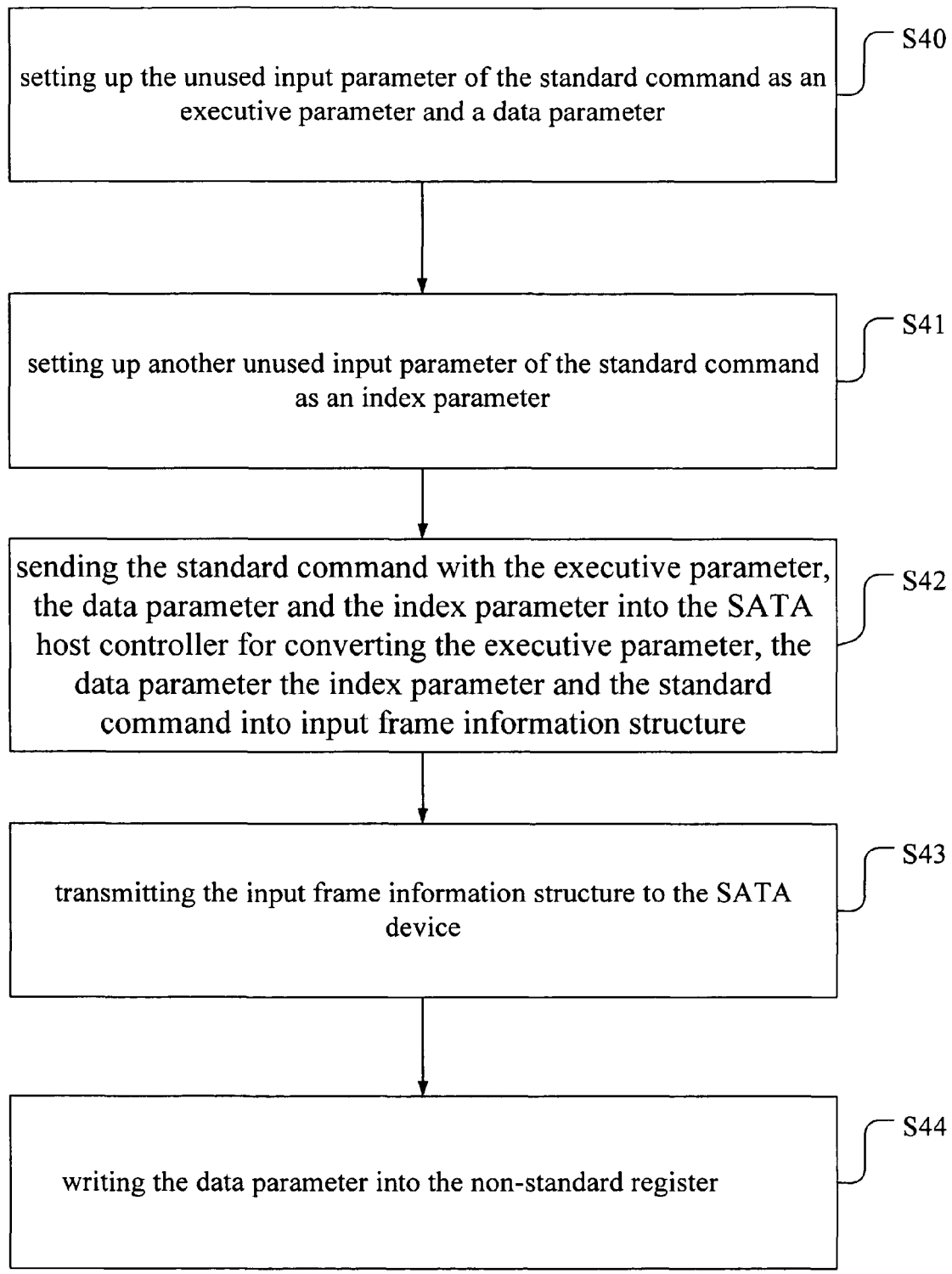
FIG. 6 is another flow chart of the present invention to write data into a non-standard register.

With reference to FIG. 6, a flowchart of another way for writing the value of the non-standard register in accordance with the present invention is disclosed. When the SATA device is driven to write data into the non-standard register, firstly take the step S40 and step S41, a plurality of unused input parameters of 28 bit READ DMA standard command is set up as an executive parameter and a data parameter while another unused input parameter of the standard command is set up as an index parameter. The executive parameter, the data parameter and the index parameter are saved into extended address of corresponding input register inside the SATA host controller.

Later, take the step S42, send the standard command with the executive parameter, the data parameter and the index parameter into the SATA host controller so that the SATA host controller saves the standard command into a command register and converts the executive parameter, the data parameter, the index parameter and the standard command into input frame information structure. Then, according to the step S43, the SATA host controller transmits the input frame information structure into the SATA device for the SATA device to execute corresponding standard issues according to the standard command and to detect the executive parameter for reading the data parameter. Finally, refer to step S44, write the data parameter into the non-standard register corresponding to the index parameter.

Figure 7:
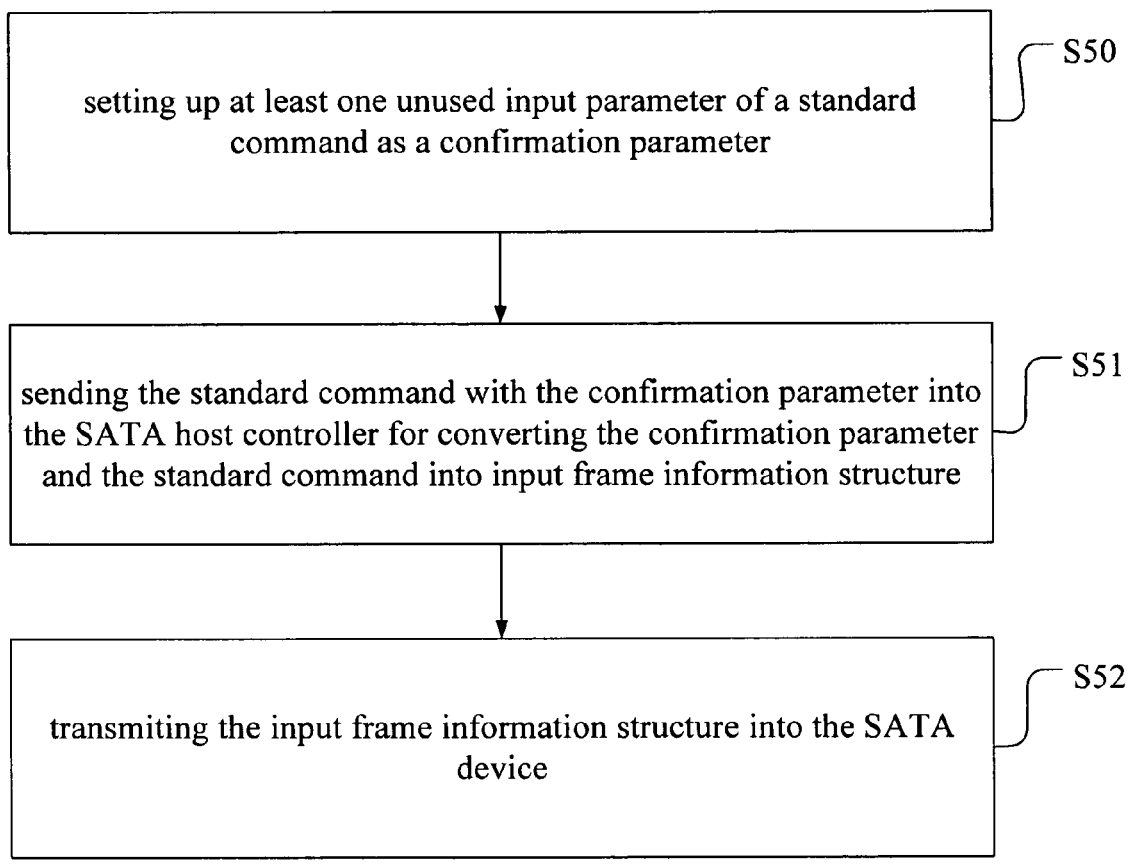
FIG. 7 is a flow chart of the present invention for confirming values of a non-standard register intended to read and write.

Because the unused input parameters corresponding to the 28 bit READ DMA standard command are filled with random numbers, the value of the unused input parameters filled randomly may be the same with the value of the executive parameter so as to make the SATA device detects the value and take the non-standard register as the register that intend to read and write. In order to avoid such situation, the present invention provides a solution. Refer to FIG. 7, as shown in step S50, at least one unused input parameter of a standard command is set up as a confirmation parameter that is saved into a corresponding input register inside the SATA host controller. In this embodiment, the Features register extension parameter and the Sector Count register extension parameter are set up as 01h, 02h in sequence and are saved in the extended address of the Features register and the Sector Count register respectively.

Then, as shown in step S51, send the standard command with the confirmation parameter into the SATA host controller so that the SATA host controller saves the standard command into a command register and converts the confirmation parameter and the standard command into input frame information structure. After that, the SATA host controller taking the step S52, transmits the input frame information structure into the SATA device. When the SATA device detects the values saved in the extended address of Features register and Sector Count register therein are 01h, 02h, it confirms the user's intention such as to read the value of or write data into the non-standard register, or even shut down the standard issues intended to execute. If the values are not 01h, 02h, the SATA device doesn't read the value of or write data into the non-standard register.

Then the present invention executes steps shown in FIG. 3 or FIG. 4, use an unused input parameter of another 28 bit READ DMA standard command and output register corresponding to an unused output parameter in response to the READ DMA standard command for reading value of the non-standard register inside the SATA device. Or run the steps in FIG. 5 or FIG. 6, use an unused input parameter of another 28 bit READ DMA standard command to write data into the non-standard register of the SATA device. Furthermore, when the SATA device detects values saved in the extended address of the Features register and the Sector Count are 02h, 01h respectively, the function of reading and writing the non-standard register is shut down and the standard command is recovered to original definition.

In addition, the present invention also provides another method to set up the confirmation parameter for the SATA device to confirm the value of the non-standard register intended to read and write. An unused input parameter of a plurality of standard commands is set up as a confirmation parameter. That is setting up Features register extension parameters as 01h, 02h in sequence and saving the confirmation parameter into the extended address of Features register inside the SATA host controller. By successively sending the 28 bit READ DMA standard command with the confirmation parameter to the SATA host controller for converting the plurality of standard command with the confirmation parameter into the input frame information structure and transmitting the input frame information structure into the SATA device sequentially, the SATA device confirms the value of the non-standard register intended to read and write when the SATA device detects the values saved in the extended address of Features register are 01h, 02h sequentially. The values of the Features register in reverse sequence are for shutting down the function of reading and writing the non-standard register.

Figure 8:
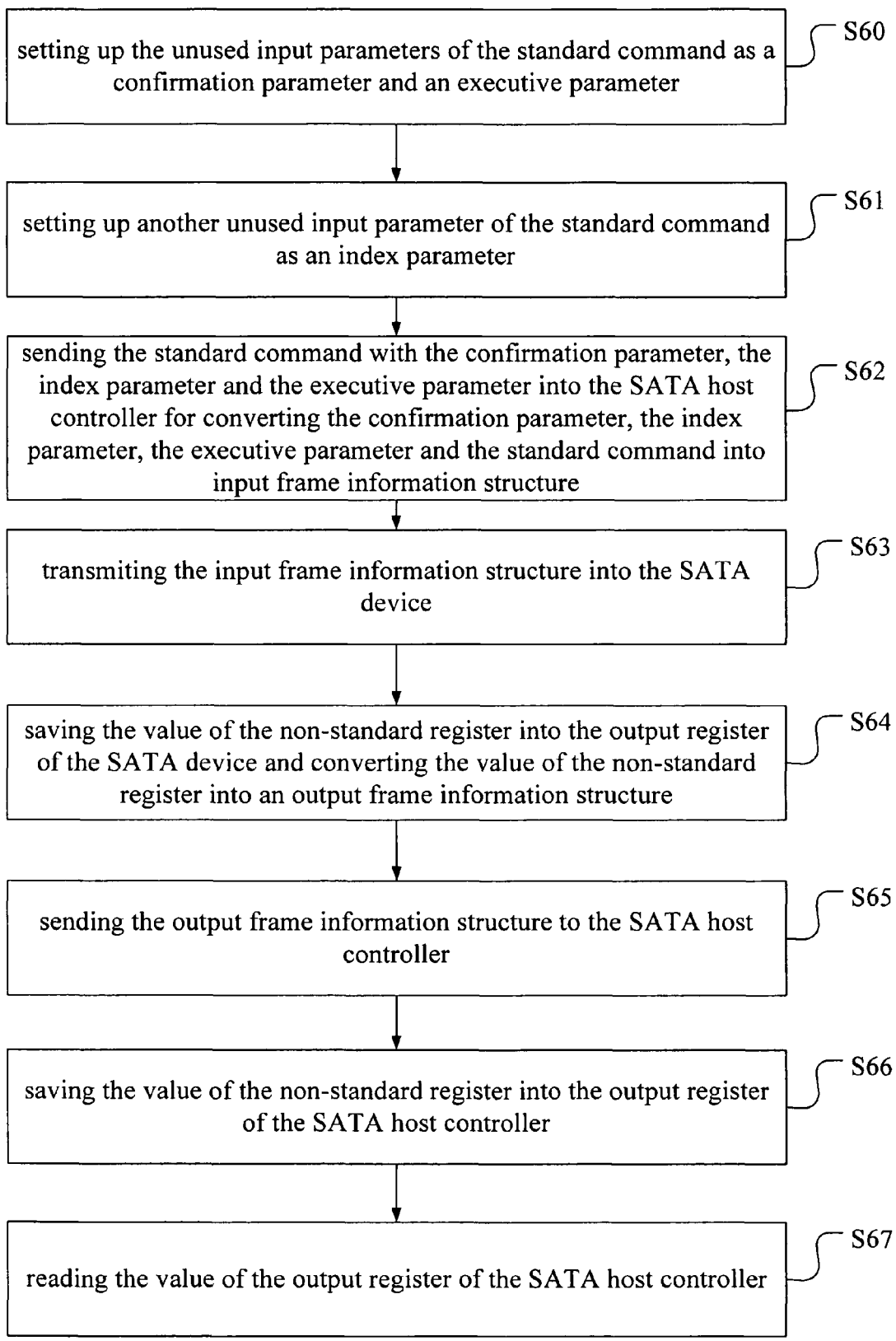
FIG. 8 is a further flow chart of the present invention to read values of a non-standard register.

Refer to FIG. 8, a further embodiment is disclosed. The difference between this embodiment and above embodiment is in that a plurality of unused input parameters of a standard command is set up for the SATA device for confirmation and reading of the value of the register intended to read. First, as shown in step S60 and step S61, set up the unused input parameters of the standard command as a confirmation parameter and an executive parameter. And another unused input parameter of the standard command is set up as an index parameter. The confirmation parameter, the executive parameter and the index parameter are saved into extended address of a corresponding input register inside the SATA device. There is no need for this embodiment to set up an unused input parameter of another standard command as the confirmation parameter.

Later, taking the step S62 send the standard command with the confirmation parameter, the index parameter and the executive parameter into the SATA host controller so that the SATA host controller saves the standard command into a command register and converts the confirmation parameter, the index parameter, the executive parameter and the standard command into input frame information structure. After that, as shown in the step S63, transmit the input frame information structure into the SATA device for the SATA device to confirm the value of the non-standard register intend to read according to the confirmation parameter and the executive parameter. Then the SATA device reads the value of the non-standard register corresponding to the index parameter. Finally, run from the step S64 to the step S67, please refer to FIG. 3, from the step S13 to the step S16 or FIG. 4, from the step S24 to the step S27. Thus, the value of the non-standard register of the SATA device is learned.

Figure 9:
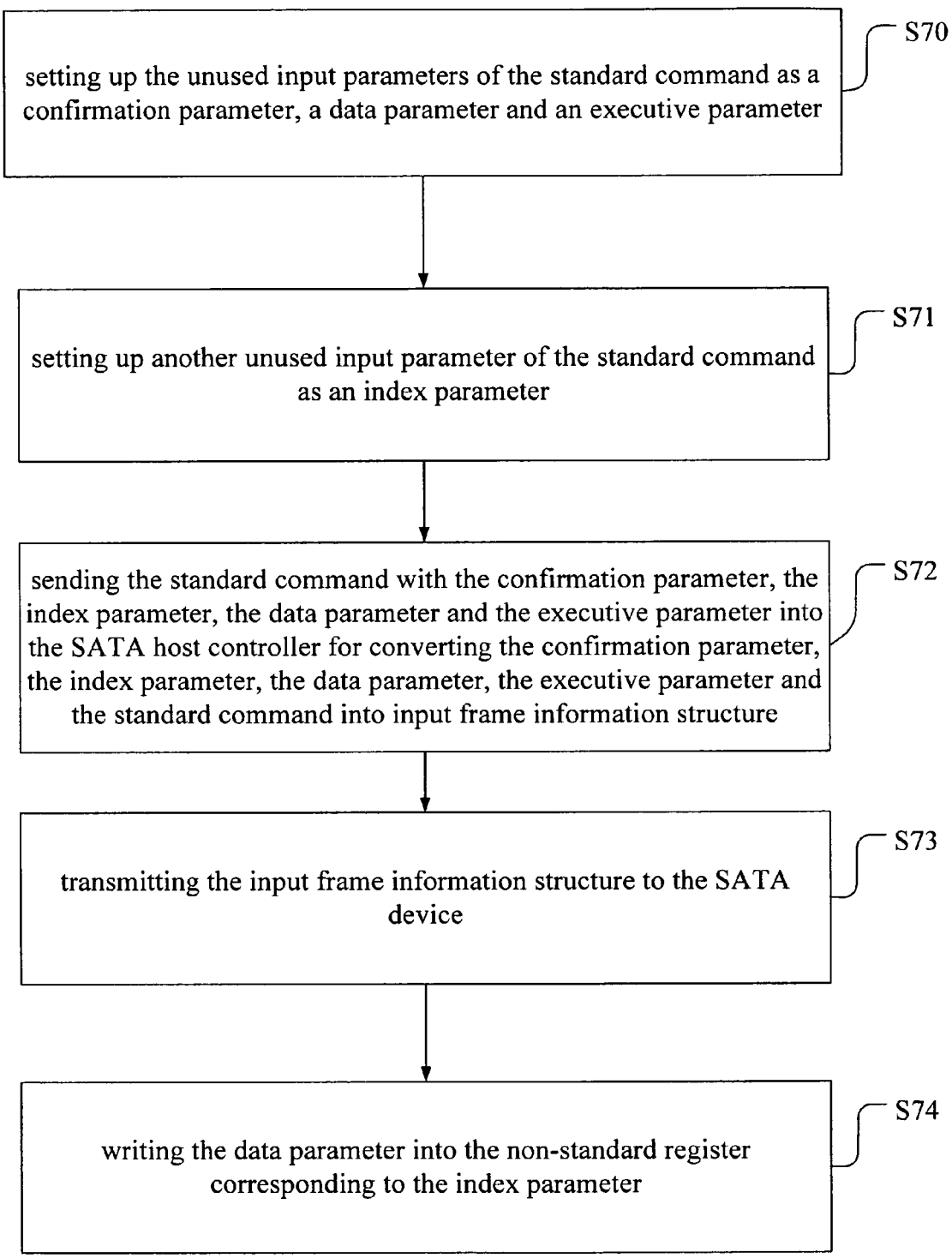
FIG. 9 is a further flow chart of the present invention to write data into a non-standard register.

Refer to FIG. 9, a further embodiment of the present invention for writing data into the non-standard register is disclosed. This embodiment is the same with the above embodiment is in that a plurality of unused input parameters of a standard command is set up for the SATA device for confirming the data intended to be written into the non-standard register. First, as shown in step S70 and step S71, set up the unused input parameters of the standard command as a confirmation parameter, a data parameter and an executive parameter. And another unused input parameter of the standard command is set up as an index parameter. The confirmation parameter, the executive parameter and the index parameter are saved into extended address of a corresponding input register inside the SATA device. Then take the step S72, send the standard command with the confirmation parameter, the index parameter, the data parameter and the executive parameter into the SATA host controller so that the SATA host controller saves the standard command into a command register and converts the confirmation parameter, the index parameter, the data parameter, the executive parameter and the standard command into input frame information structure. After that, as shown in the step S73, transmit the input frame information structure into the SATA device for the SATA device to confirm data intended to be written into the non-standard register according to the confirmation parameter and the executive parameter, and to read the data parameter. Then refer to step S74, the data parameter is written into the non-standard register corresponding to the index parameter.

In summary, the present invention relates to a method for reading and writing non-standard register of Serial Advanced Technology Attachment (SATA) devices that uses a standard command having at least one unused input parameter and an output register corresponding to at least one unused output parameter in response to the standard command. An unused input parameter of standard command is set up as an executive parameter and then through a SATA host controller, the executive parameter is converted to input frame information structure (FIS) that is transmitted to the SATA device for being detected so as to read the value of non-standard register and save the value into an output register of the SATA device. After that, the value of the non-standard register of the SATA device is converted into output frame information structure that is sent to the SATA host controller for saving the value of the non-standard register into a corresponding output register of the SATA host controller. Thus users read the output register of the SATA host controller so as to learn the value of the non-standard register.

Furthermore, when information is intended to write into the non-standard register, the unused input parameter of the standard command is set up as an executive parameter and a data parameter that are converted into input frame information structure by the SATA host controller. Then the input frame information structure is sent to the SATA device so that the SATA device detects the executive parameter and writes the data parameter into the non-standard register. Thus the flexibility of reading and writing of the non-standard register is enhanced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for reading non-standard register of Serial Advanced Technology Attachment (SATA) devices by using an unused input parameter of a standard command to drive a SATA device to read a value of the non-standard register, and saving the value into an output register of the SATA device corresponding to an unused output parameter in response to the standard command, comprising the steps of:
   setting up the unused input parameter as an executive parameter;
   sending the standard command with the executive parameter into a SATA host controller for converting the standard command and the executive parameter to an input frame information structure;
   transmitting the input frame information structure to the SATA device for detecting the executive parameter by the SATA device to read the value of the non-standard register;
   saving the value of the non-standard register into the output register of the SATA device and converting the value of the non-standard register into an output frame information structure;
   sending the output frame information structure to the SATA host controller;
   saving the value of the non-standard register into the output register of the SATA host controller; and
   reading the value of the output register of the SATA host controller.

2. The method as claimed in claim 1, wherein before setting up the unused input parameter as an executive parameter, further comprising the steps of:
   setting up at least one unused input parameter of another standard command as a confirmation parameter;
   sending the standard command with the confirmation parameter into the SATA host controller for converting the standard command and the confirmation parameter into the input frame information structure; and
   transmitting the input frame information structure having the standard command and the confirmation parameter into the SATA device for the SATA device to detect the confirmation parameter and confirm the value of the non-standard register intended to read.

3. The method as claimed in claim 2, further comprising:
   saving the confirmation parameter into a corresponding input register of the SATA host controller.

4. The method as claimed in claim 2, further comprising:
   saving the standard command with the confirmation parameter into a command register of the SATA host controller.

5. The method as claimed in claim 1, wherein the step of setting up the unused input parameter as an executive parameter further comprises:
   setting up another unused input parameter of the standard command as a confirmation parameter; and
   converting the confirmation parameter into the input frame information structure for the SATA device to detect the confirmation parameter and to confirm the value of the non-standard register intended to read.

6. The method as claimed in claim 5, further comprising:
   saving the confirmation parameter into a corresponding input register of the SATA host controller.

7. The method as claimed in claim 1, wherein the step of setting up the unused input parameter as an executive parameter further comprises:
   saving the executive parameter into a corresponding input register of the SATA host controller.

8. The method as claimed in claim 1, wherein the step of setting up the unused input parameter as an executive parameter further comprises:
   setting up another unused input parameter of the standard command as an index parameter into the SATA host controller; and
   converting the index parameter into the input frame information structure for the SATA device to detect the index parameter and to read the value of the non-standard register corresponding to the index parameter.

9. The method as claimed in claim 8, further comprising:
   saving the index parameter into a corresponding input register of the SATA host controller.

10. The method as claimed in claim 1, wherein the step of sending the standard command with the executive parameter into the SATA host controller further comprises:
    saving the standard command into a command register of the SATA host controller.

11. The method as claimed in claim 1, wherein the standard command is a 28 bit standard command while the unused input parameter and the unused output parameter are extension input parameter and an extension output parameter, respectively.

12. A method for writing non-standard register of Serial Advanced Technology Attachment (SATA) devices by a standard command having a plurality of unused input parameters, comprising the steps of:
    setting up at least a pair of unused input parameters of the standard command as an executive parameter and a data parameter respectively;
    sending the standard command with the executive parameter and the data parameter into a SATA host controller for converting the standard command, the executive parameter and the data parameter into an input frame information structure;
    transmitting the input frame information structure to a SATA device for detecting the executive parameter to read the data parameter; and
    writing the data parameter into the non-standard register, wherein before the setting up the unused input parameters as an executive parameter and a data parameter respectively, further comprising the steps of:

setting up at least one unused input parameter of another standard command as a confirmation parameter;

sending the standard command with the confirmation parameter into the SATA host controller for converting the standard command and the confirmation parameter into the input frame information structure; and transmitting the input frame information structure having the standard command and the confirmation parameter into the SATA device for the SATA device to detect the confirmation parameter and confirm the data parameter intended to write into the non-standard register.

13. The method as claimed in claim 12, further comprising: saving the confirmation parameter into a corresponding input register of the SATA host controller.

14. The method as claimed in claim 12, further comprising: saving the standard command with the confirmation parameter into a command register of the SATA host controller.

15. A method for writing non-standard register of Serial Advanced Technology Attachment (SATA) devices by a standard command having a plurality of unused input parameters, comprising the steps of:

setting up at least a pair of unused input parameters of the standard command as an executive parameter and a data parameter respectively;

sending the standard command with the executive parameter and the data parameter into a SATA host controller for converting the standard command, the executive parameter and the data parameter into an input frame information structure;

transmitting the input frame information structure to a SATA device for detecting the executive parameter to read the data parameter; and writing the data parameter into the non-standard register, wherein the step of setting up the unused input parameters as an executive parameter and a data parameter respectively further comprises:

setting up another unused input parameter of the standard command as a confirmation parameter into the SATA host controller; and converting the confirmation parameter into the input frame information structure for the SATA device to detect the confirmation parameter and to confirm the data parameter intended to write into the non-standard register.

16. The method as claimed in claim 15, further comprising: saving the confirmation parameter into a corresponding input register of the SATA host controller.

17. The method as claimed in claim 15, wherein the step of setting up the unused input parameters as an executive parameter and a data parameter respectively further comprises:

saving the executive parameter into a corresponding input register of the SATA host controller; and saving the data parameter into a corresponding input register of the SATA host controller.

18. The method as claimed in claim 15, wherein the step of setting up the unused input parameters as an executive parameter and a data parameter respectively further comprises:

setting up another unused input parameter of said standard command as an index parameter; and converting the index parameter into the input frame information structure for the SATA device to detect the index parameter and to write the data parameter into the non-standard register corresponding to the index parameter.

19. The method as claimed in claim 18, further comprising: saving the index parameter into a corresponding input register of the SATA host controller.

20. The method as claimed in claim 15, wherein the step of sending the standard command with the executive parameter and the data parameter into the SATA host controller further comprises:

saving the standard command into a command register of the SATA host controller.

21. The method as claimed in claim 15, wherein the standard command is a 28 bit standard command while the unused input parameter is an extension input parameter.

* * * * *